United States Patent
Spanner et al.

(10) Patent No.: US 6,535,290 B1
(45) Date of Patent: Mar. 18, 2003

(54) OPTICAL POSITION MEASURING DEVICE WITH A BEAM SPLITTER

(75) Inventors: Erwin Spanner, Traunstein (DE); Jürgen Thiel, Traunstein (DE)

(73) Assignee: Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 09/285,121

(22) Filed: Apr. 1, 1999

(30) Foreign Application Priority Data

Apr. 4, 1998 (DE) .......................................... 198 15 241

(51) Int. Cl.⁷ ................................................. G01B 9/02
(52) U.S. Cl. ........................................ 356/499; 356/496
(58) Field of Search ................................. 356/356, 358, 356/354, 499, 496

(56) References Cited

U.S. PATENT DOCUMENTS

| | | | |
|---|---|---|---|
| 4,191,916 A | 3/1980 | Zasio et al. | |
| 4,950,079 A | 8/1990 | McMurtry et al. | |
| 5,037,206 A | * 8/1991 | Etzkorn et al. | 356/358 |
| 5,264,915 A | * 11/1993 | Huber et al. | 356/356 |
| 5,428,445 A | 6/1995 | Holzanpfel | |
| 5,486,918 A | 1/1996 | Nagashima | |
| 5,574,560 A | * 11/1996 | Franz et al. | 356/358 |
| 5,648,658 A | * 7/1997 | Hozapfel et al. | 250/237 G |

FOREIGN PATENT DOCUMENTS

| | | |
|---|---|---|
| DE | 44 22 641 | 1/1995 |
| DE | 195 04 907 | 8/1995 |
| DE | 195 06 954 | 8/1995 |
| DE | 44 28 590 | 2/1996 |
| DE | 44 36 922 | 4/1996 |
| DE | 197 48 802 | 5/1998 |
| EP | 0 513 427 | 5/1991 |
| EP | 0 670 954 | 2/1994 |
| EP | 0 305 438 | 9/1998 |
| GB | 22 80 261 | 1/1995 |
| JP | 8-5767 | 12/1996 |
| WO | WO88/06712 | 9/1988 |

OTHER PUBLICATIONS

English translation of German patent DE 44 36 922.

* cited by examiner

Primary Examiner—Frank G. Font
Assistant Examiner—Philip Natividad
(74) Attorney, Agent, or Firm—Kenyon & Kenyon

(57) ABSTRACT

A position measuring device for determining the position of two parts that are movable relatively to one another in the measuring direction, which, in addition, includes the feature of enabling an absolute reference to be established during the measurement. To this end, the position measuring device includes a light source, as well as a beam-splitter element, which splits the beam of rays emitted by the light source into at least one first and one second beam component, which are preferably oriented parallel to one another after leaving the beam-splitter element. Provision is also made for a reference reflector, as well as a measuring reflector, upon which the two beam components strike. A reference marking, as well as a scanning unit are arranged at the measuring reflector and at the reference reflector to produce a reference pulse signal at the position of the stationary reference reflector.

18 Claims, 2 Drawing Sheets

OPTICAL POSITION MEASURING DEVICE WITH A BEAM SPLITTER

FIELD OF THE INVENTION

The present invention relates to a position measuring device, which is suited for measuring relative movements and, in addition, includes the feature of enabling an absolute reference to be established when positional determinations are made.

RELATED TECHNOLOGY

As a rule, conventional interferometers, used as position measuring devices to determine the position of parts that are movable relatively to one another, merely permit relative measurements. This means, for example, that in the case of a linear movement beginning from a starting point, the travel path covered is able to be defined in fractions of the particular interferometer wavelength. In practical applications, however, when, for instance, interferometers are used as integrated measuring systems in machine tools, it is sometimes beneficial in making the positional determination to be able to establish an absolute reference to a defined location of a known position within the measuring area. When conventional incremental measuring systems, which are based on the scanning of a periodic scale graduation, are used, the absolute reference is usually established on the basis of socalled reference markings placed at known positions on the scale side. Widely varying reference markings of this kind are known, such as so-called spacing-encoded reference markings, or also reference markings at defined locations. In each case, the reference markings are scanned to produce reference pulse signals, capable of being further processed by a downstream evaluation unit.

European Patent No. EP 0 305 438 B1 and German Patent Application No. DE 195 06 954 A1 propose linking an optical scanning unit to the movable measuring reflector of an incremental-measuring interferometer to scan a scale graduation arranged in parallel with the measuring distance in a generally known way. Reference markings are placed on the scale at defined positions. In this manner, even when working with incremental-measuring interferometers, which are used to measure the position of two parts that are movable in relation to one another, an absolute reference can be established during the positional measurement.

The drawback of these variants is that the interferometer beam components in the optical reference and measuring paths at the reference position in question cover different optical paths and, accordingly, are also variably affected by fluctuations in the ambient environment. Moreover, the scale graduation expands as a function of temperature, the influence of temperature on the scale graduation expansion being substantially greater than on the laser wavelength being used as a measuring standard. Thus, there is no constant relation between the temperature-dependent characteristics of the scale graduation and those of the laser wavelength. Therefore, when working with these means, determination of a particular absolute position is encumbered by environmentally related inaccuracies.

A further drawback of these proposed variants is that one must always ensure that the signal lines, which connect the scanning unit that is movable in the measuring direction to a downstream signal-processing unit, are securely routed in the measuring operation. This requires costly cable routing systems.

In the context of producing reference pulse signals when working with incremental-measuring interferometers, reference is also made to Japanese Patent Application No. JP 8-5767 and to U.S. Pat. No. 4,191,916. Both documents describe producing a reference pulse signal at a defined position along the measuring path with the aid of an optical switch. A disadvantage of producing a reference pulse signal in this manner is the fact that the absolute reference can only be established in comparison to the highly resolving, relative interferometer measurement with comparatively low accuracy.

SUMMARY OF THE INVENTION

An object of the present invention is to provide a method for a relative measuring position measuring device, in particular an interferometer, to produce a highly resolving reference pulse signal at at least one defined absolute position. In this context, a simplest possible design for the corresponding device is desirable, as is adequate stability of the measurement with respect to any fluctuations in the environmental conditions in the measuring area.

The present invention provides a position measuring device for determining the position of two parts that are movable relatively to one another in measuring direction (x), comprising a light source (1);

beam-splitter element (2), which splits the beam of rays (10) supplied by the light source (1) into at least one first and one second beam component ($10_R$, $10_M$), which are preferably oriented parallel to one another after leaving the beam-splitter element (2);

a reference reflector (3), arranged in a stationary mount in a reference path of rays, upon which the first of the two beam components ($10_R$) strikes;

a measuring reflector (4), which is arranged in a measuring path of rays and which is movable in measuring direction (x) and upon which the second of the two beam components ($10_M$) strikes;

at least one reference marking (62), capable of being scanned by a scanning unit (5), being arranged at the reference reflector (3) or at the measuring reflector (4) to produce a reference pulse signal at the location of the reference reflector (3); and the scanning unit (5) being arranged at the other reflector (3, 4), at the measuring reflector (4) or at the reference reflector (3).

Advantageous specific embodiments of the position measuring device according to the present invention include that: (a) the reference marking (62) is arranged at the particular reflector (3, 4) in such a way that a reference pulse signal is able to be produced via the scanning unit (5) arranged at the other reflector (3, 4), in response to identical optical path lengths in the optical measuring and reference path; (b) the reference marking (62) is arranged at the movable measuring reflector (4), and the scanning unit (5) is arranged at the stationary reference reflector (3); (c) the beam-splitter element (2) being designed as a prism; (d) the beam-splitter element (2) is designed as a double-grating beam splitter; (e) the measuring reflector (4) and the reference reflector (3) each are designed as triple prisms; (f) the scanning unit (5) is designed as an optical scanning unit, which includes a scanning radiation source (51), a scanning grating (53), as well as at least one scanning detector element (55, 56), by way of which the optical scanning of at least one reference marking (62) is possible; (g) the scanning unit (5) is designed as an optical scanning unit, which is able to be supplied with light from an external scanning radiation source and which includes a scanning grating, as well as at least one scanning detector element; (h) a laser, which is also provided as the light source (1) of the position measuring device, is used as an external scanning radiation source; (i) the reference marking (62) is arranged in a reference marking unit (6), which, in addition, includes an incremental graduation (61), and scanning detector elements (56) are arranged at the scanning unit (5) to produce incremental signals indicative of the relative movement of the reference and measuring reflector (3, 4) from the optical scanning of the incremental graduation (61); (j) the reference marking (62) is designed as a field having subregions with different optical properties configured in an alternating arrangement in a reference marking track (63), next to which is arranged adjacently, in parallel, an incremental graduation (61) in an incremental graduation track (65), which is made up of a periodic sequence of subregions having different optical properties; (k) the scanning unit (5) is arranged detachably at the particular intended reflector (3, 4); (l) the reference marking (62) is arranged in a reference-marking unit (6), which is mounted, in turn, detachably at the particular intended reflector (3, 4); (m) the scanning unit (5) and/or the reference-marking unit (6) is arranged so as to be adjustable with respect to position at the reference or measuring reflector (3, 4); (n) the output signals from the scanning unit (5) are able to be supplied via a signal-transmission line (20) to a downstream signal-processing unit (9); and /or (o) reference reflector (3) is arranged at the desired absolute position along the measuring path.

The present invention provides for using a suitable beam-splitter element to split a beam of rays supplied by a light source into two preferably parallel beam components for the optical measuring and reference path of an interferometer. Arranged in a stationary mount in the optical reference path is a reference reflector, to which is connected in turn a scanning unit, used, inter alia, to produce a reference pulse signal. In this case, the reference reflector is preferably arranged at that position along the measuring path which is to be determined as the absolute position, thus, for example, at a machine zero point. Located in the optical measuring path is the measuring reflector which is movable in the measuring direction and upon which is arranged at least one reference marking. Thus, in one particularly advantageous specific embodiment, a reference pulse signal is produced via the scanning unit mounted at the reference reflector, in response to identical optical path lengths in the optical measuring and reference path. In addition to the positional signals produced by the interferometer with respect to the relative movement, the resulting output signals from the scanning unit are fed to a signal-processing unit for further processing.

As a general principle, the scanning unit and the reference marking can also be arranged on a different reflector as the case may be.

At this point, the present invention ensures that in the case of the absolute position to be detected, the optical measuring and reference paths of the interferometer are always subject to the same environmental conditions. Thus, at this position of the movable measuring reflector, which needs to be determined with the highest possible precision, one can avoid any disparate influencing of the two optical paths. One can even improve upon this by selecting a suitable beam splitter element, thereby ensuring that the optical paths traversed in the particular beam-splitter element are as precisely identical as possible, and that the two optical path components run in parallel, spaced apart to the smallest extent possible.

Moreover, in one advantageous specific embodiment, it proves to be beneficial to mount a scanning unit on the stationary reference reflector to ultimately produce the reference pulse signal. This makes it possible to avoid the costs of routing cables to a scanning unit that is movable in the measuring direction. Thus, only once does one need to select the routing of the requisite signal lines from the scanning unit to the downstream signal-processing unit.

In connection with the selected scanning of the reference marking and the embodiment of the corresponding scanning unit, the most widely varying possibilities exist, of course, within the framework of the present invention. Thus, besides optical or photoelectric scanning, other physical scanning principles can also be applied. In the same way, very different interferometer variants can also be used in conjunction with the position measuring device of the present invention, for example homodyne interferometers, heterodyne interferometers, etc.

BRIEF DESCRIPTION OF THE DRAWINGS

Other advantages and details pertaining to the present invention are revealed in the following description of an exemplary embodiment on the basis of the enclosed drawings, in which.

DETAILED DESCRIPTION

The present invention is elucidated in the following on the basis of the exemplary embodiment shown in the schematic representation of FIG. 1. The design layout shown is, of course, merely a schematized basic representation, i.e., significant variations are possible within the scope of the considerations according to the present invention.

Figure 1:
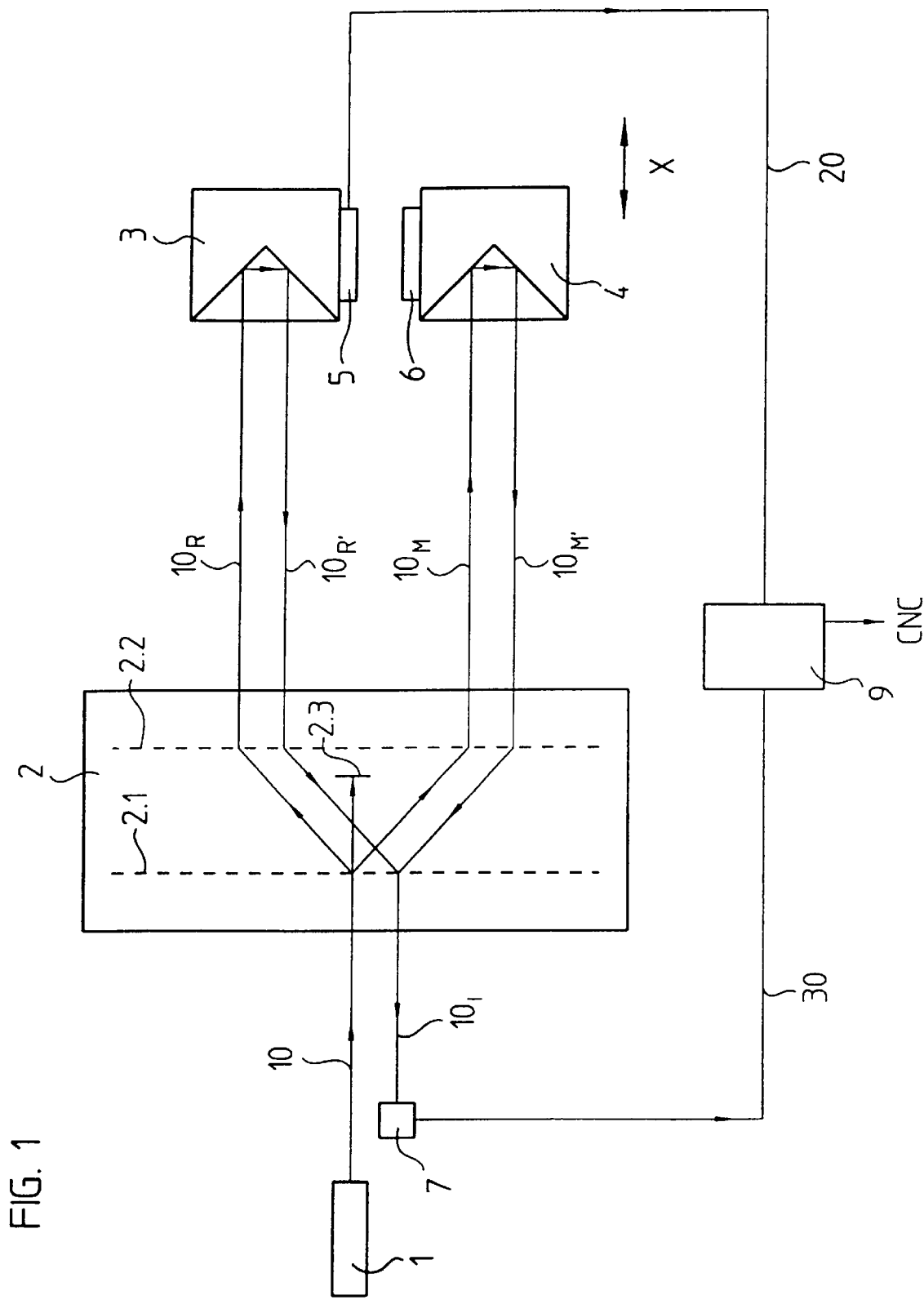
FIG. 1 shows a schematized block diagram of an exemplary embodiment of the position measuring device of the present invention in conjunction with a signal-processing unit.

The position measuring device of the exemplary embodiment of FIG. 1 includes an interferometer having a light source 1, which emits a beam of rays 10 having wavelength $\lambda$ in the direction of a beam-splitter element 2. Many types of lasers, such as He—Ne lasers, semiconductor lasers, etc., are suitable for use as the light source. The entering beam of rays 10 is split by beam-splitter element 2 into two beam components $10_R$, $10_M$, which are oriented parallel to one another after leaving beam-splitter element 2.

As a beam-splitter element 2, the exemplary embodiment of FIG. 1 provides for a double-grating beam splitter made up of two diffraction gratings 2.1, 2.2, which are arranged in parallel to one another and which diffract or split the incident beam of rays. In the illustrated exemplary embodiment, the beam of rays 10 originating from light source 1 is split into the +/−1. order, as well as the 0. order of diffraction, with the 0 order of diffraction between the two diffraction gratings 2.1, 2.2 being masked out by an aperture 2.3. After renewed diffraction of the two beam components, the two parallel beam components $10_R$, $10_M$ leave beam-splitter element 2 in the direction of a reference and measuring path of rays.

With respect to beam-splitter element 2 used in this specific embodiment, reference is also made at this point to European Patent No. EP 0 670 467 B1 and corresponding U.S. Pat. No. 5,574,560, which are hereby incorporated by reference herein. Besides the embodiment of a beam-splitter element disclosed in this patent, alternative specific embodiments of beam-splitters also are possible. These include, for instance, known prisms of very different designs, such as Kosters or Dove prisms, beam-splitter plates or functionally equivalent optical systems. It proves to be advantageous, when working with the particular beam-splitter elements, for the entering beam of rays to be split in such a way that, after emerging from beam-splitter element 2, the at least two beam components $10_R$, $10_M$ run in parallel to one another.

Arranged in a stationary mount in the reference path of rays of the interferometer is a reference reflector 3, upon which first beam component $10_R$ strikes. Arranged in the measuring path of rays is a measuring reflector 4, which is displaceable in measuring direction x and upon which second beam component $10_M$ strikes, and whose relative or absolute position needs to be determined.

In the illustrated specific embodiment, the two reflectors 3, 4 are designed in the measuring and reference path of rays of the interferometer in each case as triple prisms whose reflector surfaces are oriented at a specific angle to one another. As a general principle, other retro-reflecting optical elements, such as triple mirrors, plane reflectors, or also so-called "cat's eyes", are suited for use as reflectors at this location.

After the two beam components $10_R$, $10_M$ are re-reflected off of measuring and reference reflectors 3, 4, beam components $10_R'$, $10_M'$ again attain beam-splitter element 2, and are superimposed there or brought into interference. The resulting interference beam of rays $10_1$, after leaving beam-splitter element 2, strikes an optoelectronic detector element 7, whose output signals, modulated as a function of displacement, are fed via a signal-transmission line 30 to a downstream signal-processing unit 9. Interference beam of rays $10_1$, emerging in the direction of detector element 7, is directed, through proper selection of beam-splitter element 2, parallel to beam of rays 10 emitted by light source 1. The interference signals for determining the relative position of measuring reflector 4 or of the part connected thereto are evaluated in a generally known manner to provide information on the relative movement of measuring reflector 4 in measuring direction x. Depending on the selected evaluation of the interference signals, the relative position of measuring reflector 4 can be defined in increments or measuring steps, which correspond to a predefined fraction of wavelength λ of light source 1, for example λ/8.

In the depicted exemplary embodiment of the position measuring device of the present invention, the interferometer signals are first processed in signal-processing unit 9 mounted near or at the position measuring device. The signal processing can be in the form of a signal amplification, signal correction, signal period variation, determination of absolute positional data, etc. From signal processing unit 9, positional data processed or conditioned in this manner are then transmitted to an evaluation unit; in the case of use of the position measuring device according to the present invention in a machine tool, this could be a known computerized numerical control CNC application.

Of course, the illustrated interferometer variant having merely one optoelectronic detector element 7 is to be understood schematically, i.e., within the scope of the present invention, 90° phase-displaced interference signals can also be generated in a generally known manner using optical polarization elements in the optical beam paths. These interference signals are then detected using at least two detector elements and fed to signal processing unit 9. As a result, directional information on the movement of measuring reflector 4 is then available as well. For the sake of clarity, merely the main optical path of the interferometer is shown.

At this point, to also be able to establish an absolute reference during the relative interferometric measurement, a scanning unit 5 is also provided at the stationary reference reflector 3. Scanning unit 5, which is mounted at a defined relative position at reference reflector 3, is merely indicated schematically in the illustration of FIG. 1 and is primarily used to produce a scanning signal or a reference pulse signal at at least one defined position of movable measuring reflector 4. For this, a reference marking placed at movable measuring reflector 4 is scanned. In the illustrated exemplary embodiment, reference marking unit 6 is used to arrange the reference marking at measuring reflector 4. Alternatively, it would also be conceivable to place a reference marking of this kind directly on measuring reflector 4.

As a general principle, it is also possible to mount the scanning unit at the movable measuring reflector and to arrange the reference marking at the stationary reference reflector.

The scanning signals, e.g., the desired reference pulse signals, produced via scanning unit 5, are fed via a signal-transmission line 20 to downstream signal-processing unit 9, which also processes, inter alia, the interference signals, modulated as a function of displacement, from the at least one optoelectronic detector element 7. From signal-processing unit 9, both the reference pulse signal as well as the interferometrically defined positional values can then be transmitted to the downstream evaluation unit, e.g. to a computerized numerical control CNC.

In this context, scanning unit 5, as well as the reference marking are preferably arranged at the two reflectors 3, 4 in such a way that when the beam components $10_R$, $10_M$ have identical optical path lengths in the optical measuring and reference path, the reference pulse signal is generated on the side of scanning unit 5. For this reason, when using the position measuring device according to the present invention in a machine tool, for example, stationary reference reflector 3 should be arranged, together with scanning unit 5, on the side of the machine at the desired reference point, e.g., at the machine zero point. As a general principle, the most expedient arrangement of the reference location or, in the illustrated example, of stationary reference reflector 3, is at that location along the measuring distance where measurements need to be taken the most often, or where the most precise measuring accuracy is required. In one possible specific embodiment, the reference reflector can also be placed in the middle of the measuring length to be covered.

This manner of generating reference pulse signals has decisive advantages since it is ensured at the location where the reference pulse signal is produced that the optical paths traversed by the two beam components $10_M$, $10_R$ are essentially symmetrical. If, in addition, small spacing between the parallel-running beam components is ensured through proper dimensional design of beam-splitter element 2, then neither fluctuations in vacuum wavelength λ of light source 1, nor fluctuations in the environmental conditions can affect the exact positional determination at the reference position. In addition, any temperature-related expansion of the mounting surface of stationary reflector 3 has no effect on the precise determination of the reference position.

Figure 2A:
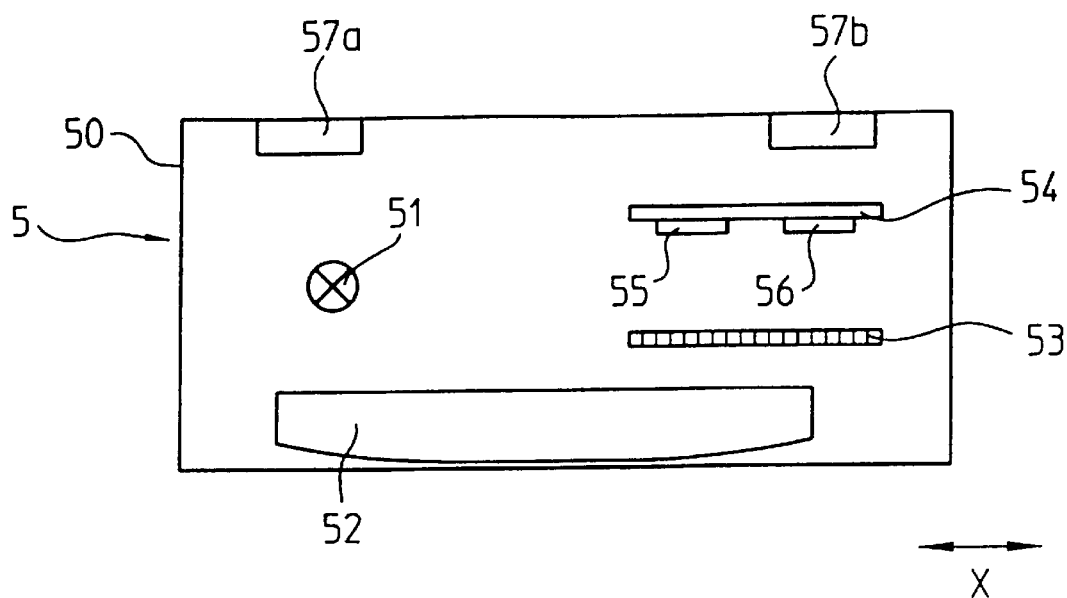
FIG. 2a shows a schematic depiction of a possible specific embodiment of the requisite scanning unit in a side, sectional view.

Further details pertaining to one possible embodiment of scanning unit 5, as well as of the reference marking, are elucidated in the following on the basis of the two FIGS. 2a and 2b. In a side, sectional, schematic view, FIG. 2a shows one possible design variant of an optical scanning unit, which, as explained, is mounted at stationary reference reflector 3 and renders possible an incident light scanning of a reference marking. In a plan view of the measuring plane, FIG. 2b likewise shows in schematic form one possible embodiment of reference marking unit 6 at the movable measuring reflector, which can be scanned by the scanning unit of FIG. 2a.

It should be mentioned at this point, however, that these are merely possible practical embodiments of the scanning unit and the reference marking, and are in no way to be understood as limiting for the present invention. Accordingly, other optical scanning units and scanning units based on other physical scanning principles can certainly be used as well. This applies analogously to the embodiment of the reference marking.

In this connection, reference is made explicitly, for example, to European Patent No. EP 0 513 427 B1 and German Patent Application No. DE 197 48 802 A1, which correspond to U.S. Pat. No. 5,428,445 and U.S. Ser. No. 08/974,765, respectively, all four of which are hereby incorporated by reference herein. These documents describe particularly advantageous methods for generating a highly-resolving reference pulse signal that can be advantageously applied in conjunction with the present invention. Generating a reference pulse signal interferentially turns out to be particularly beneficial in this case, since one is then able to obtain an extremely narrow reference pulse signal.

The specific embodiment of optical scanning unit 5 schematically shown in FIG. 2a includes a housing 50, in which a scanning radiation source 51, as well as an upstream optics 52 are arranged on the transmitting side. Alternatively to the variant shown, provision can also be made between radiation source 51 and optics 52 for a suitable transmitting grating. The beam of rays directed in parallel by optics 52 arrives at the reference marking (and, if indicated, an incremental graduation), and is reflected there. The beam then enters via scanning grating 53 again into scanning unit 5, where, after passing once more through optics 52, the re-reflected beam of rays is detected by one or more opto-electronic scanning detector elements 55, 56. Discernable in the view of FIG. 2a, are two scanning detector elements 55, 56, arranged on a support board 54. In this case, at least one of scanning detector elements 55 is used to detect the reference pulse signal via the optical scanning of a reference marking field, while provision is made for one or a plurality of other scanning detector element(s) 56 for optically scanning an incremental graduation, which can be arranged, in addition to the reference marking, at the movable measuring reflector.

Likewise schematically indicated in housing 50 of scanning unit 5 are slotted boreholes 57a, 57b, through which scanning unit 5 can be detachably and adjustably secured to the particular intended reflector. Of course, alternative methods for securing and adjusting scanning unit 5 are feasible within the scope of the present invention.

In the schematically depicted variant of an optical scanning unit 5 in FIG. 2a, a scanning radiation source 51 is arranged in housing 50 of scanning unit 5. Provision can also be optionally made to configure the scanning radiation source separately or remotely from the housing, and to feed the supplied light, for example, via optical waveguides to the scanning unit. A variant of this kind proves to be advantageous since it makes it possible to minimize any disturbing temperature influences produced by the scanning radiation source in the scanning unit.

As an external scanning radiation source, it can also be provided in the last-mentioned case to use the laser, which is also used as the light source of the position measuring device in the interferometer. This eliminates the need for an additional scanning radiation source. The portion of the light source radiation used for scanning is then likewise preferably supplied via optical waveguides to the scanning unit.

Figure 2B:
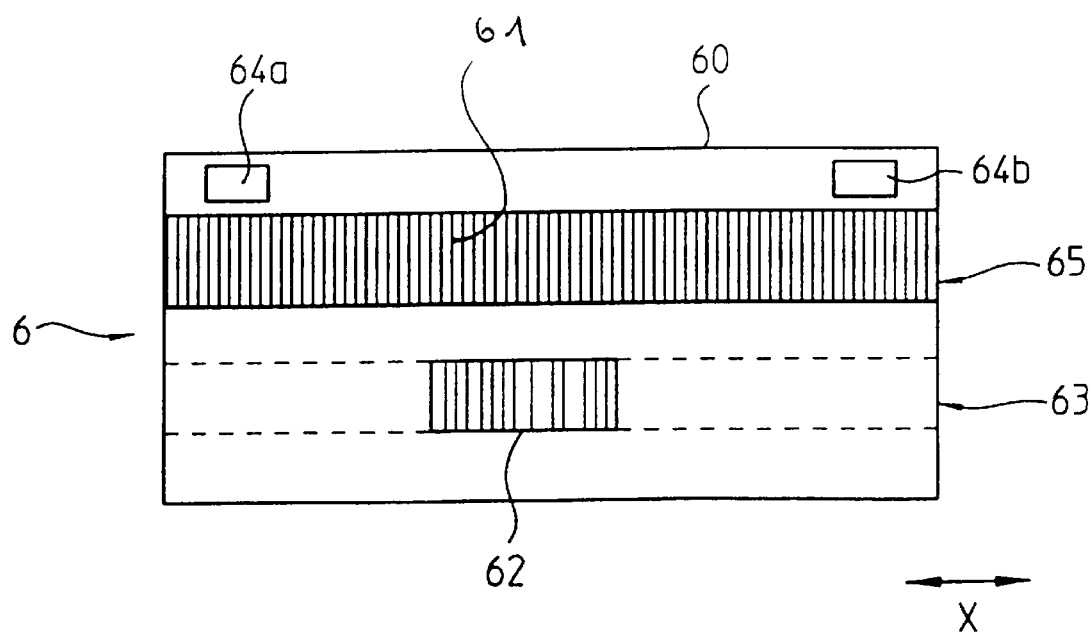
FIG. 2b shows a schematized plan view of reference markings arranged on the measuring reflector in conjunction with an incremental scale graduation mark also provided there.

FIG. 2b shows a plan view of reference marking unit 6 with reference marking 62 placed therein, which can be scanned with the aid of a scanning unit in accordance with FIG. 2a in incident light. Provided in this case on a carrier component 60 are reference markings 62, parallel and adjacent to one another in a reference marking track 63, as well as incremental graduation 61 arranged parallel thereto in an incremental graduation track 65. In the case of the incident light scanning, reference marking 62, as well as incremental graduation 61 are each made up of an adjacent arrangement of reflecting and non-reflecting regions; or in the general optical scanning case, of regions having different optical properties. While in this case, a periodic arrangement of regions of this kind is provided in incremental graduation 61, these regions having different optical properties are distributed aperiodically in the field having reference marking 62.

As in the case of the scanning unit, provision is made for a detachable and adjustable mounting of reference-marking unit 6 at the particular intended reflector. Thus, slotted boreholes 64a, 64b are placed again in carrier component 60, to enable reference marking 62 or reference-marking unit 6 to be detachably as well as adjustably secured at the measuring reflector.

The additional incremental graduation 61 provided in the illustrated exemplary embodiment is used for properly adjusting scanning unit 5 and reference marking 62. To this end, when the position measuring device according to the present invention is installed, incremental graduation 61 is scanned to produce a so-called moire signal, on the basis of which scanning unit 5 and reference marking 62 can be checked for proper alignment and, if indicated, adjusted accordingly. For this purpose, in turn, one or a plurality of scanning detector elements are arranged at scanning unit 5 to produce incremental signals indicative of the relative movement of the reference and measuring reflector from the optical scanning of the incremental graduation.

It should again be emphasized, as already indicated above, that the described variant of the scanning unit is merely to be understood as an example, i.e., alternative scanning variants for producing the reference pulse signal within the scope of the present invention are certainly feasible. These include, for instance, the mentioned interferential production of a highly resolving reference pulse signal within the range of the interferometer signal period, an incident-light scanning of a reference marking, the use of so-called chirped graduation structures, etc.

In the same way, of course, diverse known variants for producing so-called clock-pulse and differential-mode reference pulse signals can be used to enhance the reliability of detection.

The position measuring device according to the present invention can be used, for instance, as an integrated measuring system in a machine tool, for example to determine with utmost precision the relative position of the tool and workpiece. In this case, the measuring reflector is connected to a movable part of the machine tool, while the remaining part of the interferometer structure is mounted at the stationary part of the machine tool. A number of alternatives exist, besides these, both with respect to the field of application, as well as with respect to the specific embodiment of the position measuring device according to the present invention.

What is claimed is:

1. A position measuring device for determining a position of two parts movable relative to one another in a measuring direction comprising:
   a light source for supplying a beam of light;
   a beam-splitter element for splitting the beam into at least a first beam component and a second beam component;
   a reference reflector arranged in a stationary mount in a reference ray path, the reference reflector for receiving the first beam component;
   a measuring reflector arranged in a measuring ray path and movable in the measuring direction, the measuring reflector for receiving the second beam component;
   a scanning unit arranged at one of the reference reflector and the measuring reflector providing a scanning or reference pulse signal; and
   at least one reference marking capable of being scanned by the scanning unit so as to produce a reference pulse signal, the at least one reference marking being arranged at the other of the reference reflector and the measuring reflector.

2. The position measuring device as recited in claim 1 wherein the first and second beam components are oriented in parallel after leaving the beam-splitter element.

3. The position measuring device as recited in claim 1 wherein the at least reference marking is arranged so that the reference pulse signal is be produced when identical optical path lengths exist in the measuring ray path and the reference ray path.

4. The position measuring device as recited in claim 1 wherein the at least one reference marking is arranged at the measuring reflector and the scanning unit is arranged at the reference reflector.

5. The position measuring device as recited in claim 1 wherein the beam-splitter element is a prism.

6. The position measuring device as recited in claim 1 wherein the beam-splitter element is a double-grating beam splitter.

7. The position measuring device as recited in claim 1 wherein the measuring reflector and the reference reflector each are triple prisms.

8. The position measuring device as recited in claim 1 wherein the scanning unit is an optical scanning unit, the optical scanning unit including a scanning radiation source, a scanning grating, and at least one scanning detector element.

9. The position measuring device as recited in claim 1 wherein the scanning unit is an optical scanning unit capable of being supplied with light from an external scanning radiation source, the optical scanning unit including a scanning grating and at least one scanning detector element.

10. The position measuring device as recited in claim 9 wherein the external scanning radiation source is the light source, the light source being a laser.

11. The position measuring device as recited in claim 1 wherein the at least one reference marking is arranged in a reference marking unit, the reference marking unit further including an incremental graduation, and the scanning unit including scanning detector elements to produce incremental signals indicative of a relative movement of the reference and measuring reflector as a function of an optical scanning of the incremental graduation.

12. The position measuring device as recited in claim 11 wherein the at least one reference marking is a field having subregions with different optical properties configured in an alternating arrangement in a reference marking track, the incremental graduation being arranged adjacently and in parallel to the at least one reference marking in an incremental graduation track, the incremental graduation track including a periodic sequence of subregions having different optical properties.

13. The position measuring device as recited in claim 1 wherein the scanning unit is arranged detachably at the one of the reference and measuring reflectors.

14. The position measuring device as recited in claim 1 wherein the at least one reference marking is arranged in a reference-marking unit mounted detachably at the other of the reference and measuring reflectors.

15. The position measuring device as recited in claim 1 wherein at least one of the scanning unit and the at least one reference marking are adjustable positionally on a respective of the reference or measuring reflector.

16. The position measuring device as recited in claim 1 wherein output signals from the scanning unit are capable of being supplied via a signal-transmission line to a downstream signal-processing unit.

17. The position measuring device as recited in claim 1 wherein the reference reflector is arranged at a predetermined absolute position along the measuring path.

18. A position measuring device for determining a position of two parts movable relative to one another in a measuring direction comprising:
   a light source for supplying a beam of light;
   a beam-splitter element for splitting the beam of light into at least a first beam component and a second beam component;
   a reference reflector arranged in a stationary mount in a reference ray path, the reference reflector for receiving the first beam component;
   a measuring reflector arranged in a measuring ray path and movable in the measuring direction, the measuring reflector for receiving the second beam component;
   a scanning unit arranged at one of the reference reflector and the measuring reflector providing a scanning or reference pulse signal; and
   at least one reference marking capable of being scanned by the scanning unit so as to produce a reference pulse signal, the at least one reference marking being arranged at the other of the reference reflector and the measuring reflector,
   wherein the first and second beam components are parallel to each other after leaving the beam-splitter element, and are separated by a greater-than-zero distance.

* * * * *